I. M. BARNARD & J. W. LAWLER.
LOAD EJECTOR FOR BULL HAY RAKES.
APPLICATION FILED JAN. 29, 1912.
1,073,948.
Patented Sept. 23, 1913.
2 SHEETS—SHEET 2.
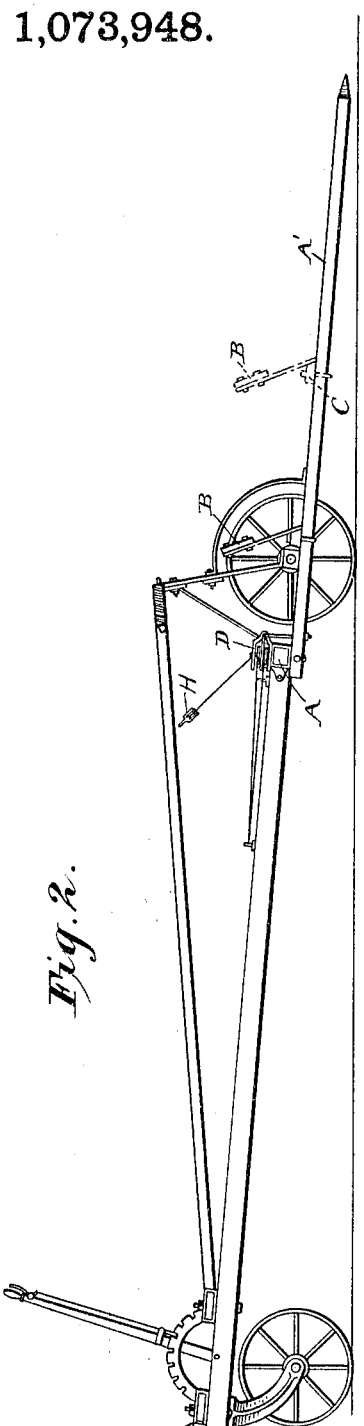
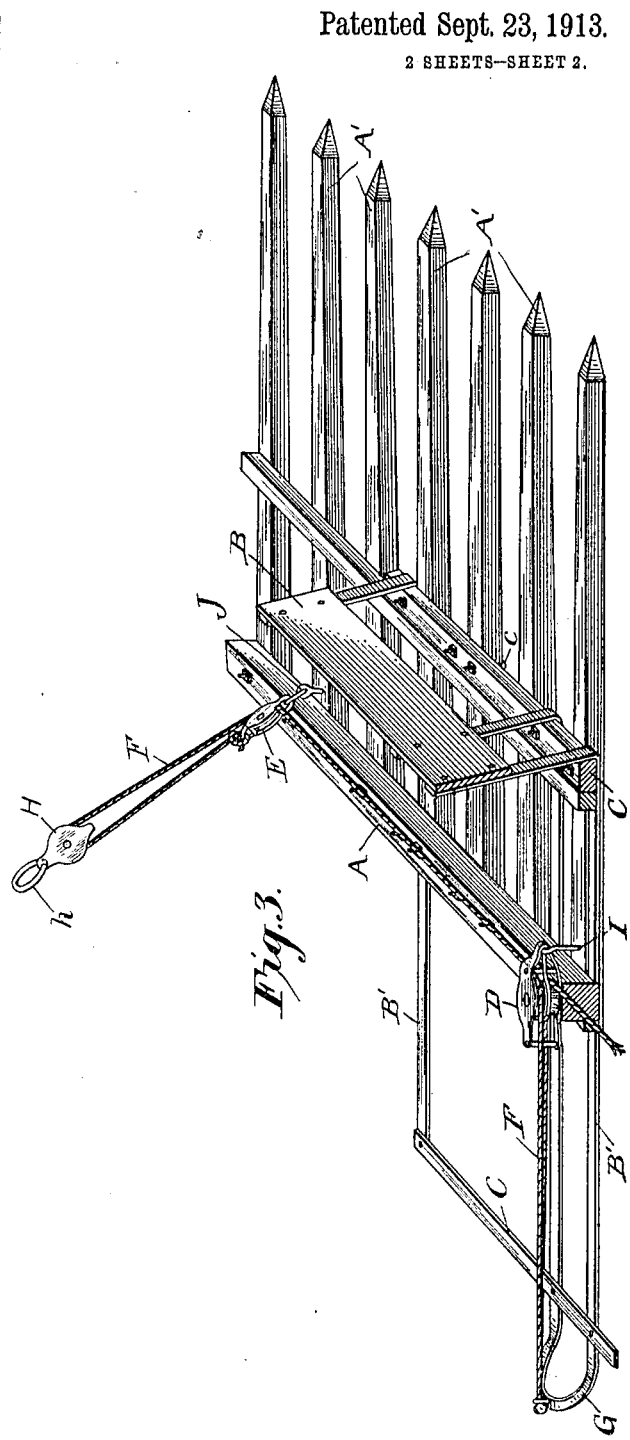
Witnesses:
Inventor

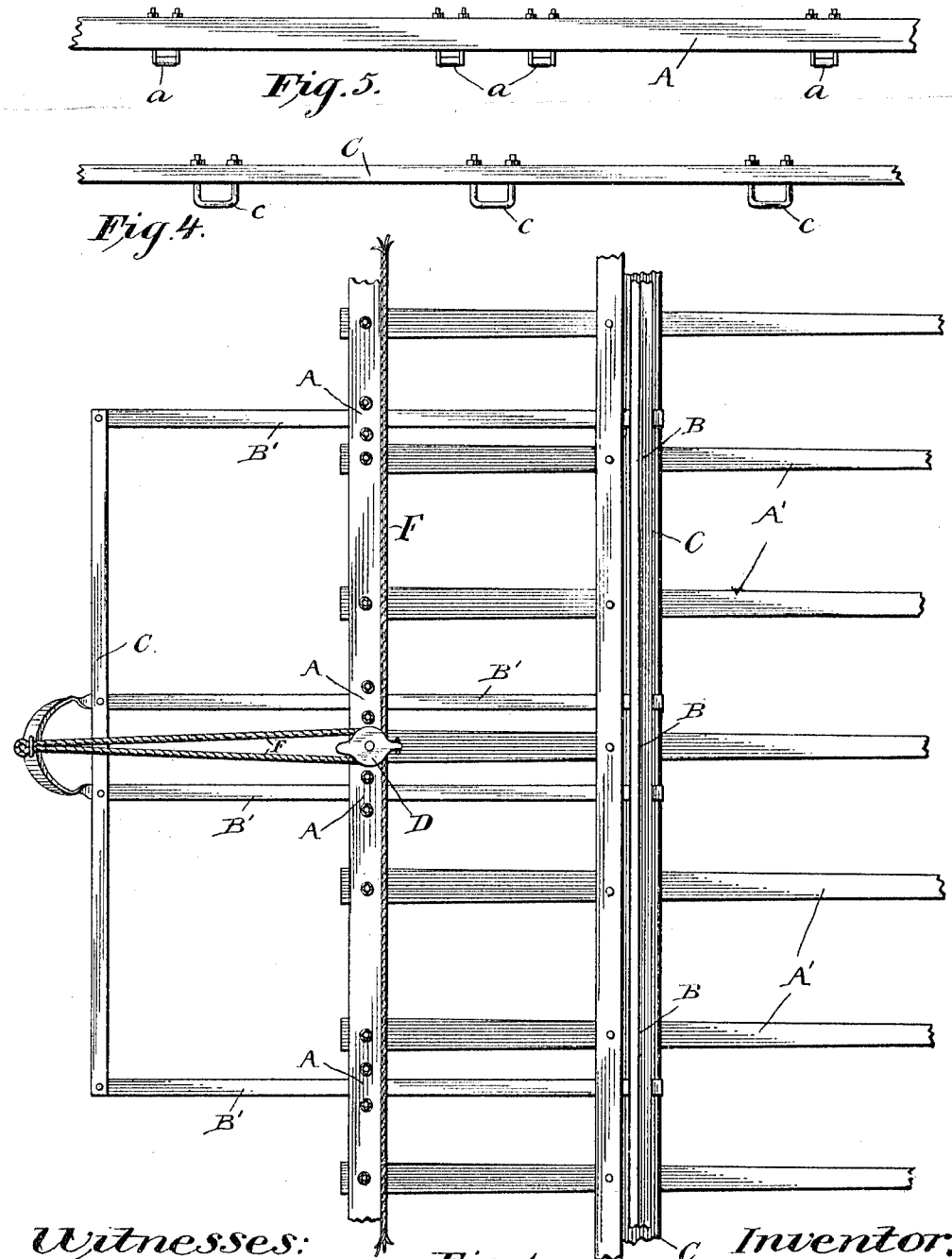

UNITED STATES PATENT OFFICE.

ISHAM M. BARNARD AND JOHN W. LAWLER, OF FOWLER, COLORADO.

LOAD-EJECTOR FOR BULL HAY-RAKES.

1,073,948.  Specification of Letters Patent.  Patented Sept. 23, 1913.

Application filed January 29, 1912. Serial No. 674,283.

*To all whom it may concern:*

Be it known that we, ISHAM M. BARNARD and JOHN W. LAWLER, citizens of the United States, and residents of Fowler, in the county of Otero and State of Colorado, have invented an Improvement in Load-Ejectors for Bull Hay-Rakes, of which the following is a specification.

The object of our invention is to provide a simple and comparatively inexpensive load-ejector, or load-pusher, for bull-rakes, and which also operates efficiently with light draft or traction.

The details of construction, combination, and operation of parts are hereinafter described, and illustrated in the accompanying drawing, in which—

Figure 1 is a plan view of our invention applied to a bull-rake. Fig. 2 is a side view of the same parts, including the usual rear extension of the bull-rake. Fig. 3 is a perspective view of a portion of the rake and the load-ejector or load-pusher. Fig. 4 is a front view of the front bar or head beam of the ejector frame. Fig. 5 is a front view of the cross beam or head of the bull-rake.

As shown in Figs. 1 and 3, the heads of the bull-rake teeth A' are bolted to a cross head or beam A. The ejector frame is formed of four parallel longitudinal bars B' and two cross bars C which are bolted to the front and rear portions of the bars B'.

The rake head A has pendent metal loops or stirrups a, and in these the ejector bars B' are supported slidably.

The head of the ejector frame which constitutes the ejector proper is formed by bending upward into practically vertical position the forward ends of the ejector bars B'—see Figs. 2 and 3—and the upper ends of said bars are rigidly connected by a cross bar or wide plate B—see Fig. 3. Thus the ejector or load pusher formed of the longitudinal bars B', transverse bars C, and the vertical head or ejector proper B is connected with the bull-rake and adapted to slide thereon, while the teeth of the latter are supported and adapted to slide in loops c pendent from the front bar of the ejector frame.

A double pulley block D is secured to the middle of the rake head A, and a single pulley block E is similarly secured to each end of the rake head. Ropes F are secured to a raised rear extension G of the ejector frame, and pass through the double pulley block D and extend right and left through the single pulley blocks E. The outer ends of these ropes are looped through single pulley blocks H, each having a ring h for attachment to the collar of a harness. Screw-eyes J—see Fig. 3—attach the pulleys to the rake teeth.

The operation of the load ejector or pusher will now be understood.

A horse or mule is hitched in the usual way at each side of the ejector frame with head toward the rake, and the ring h of each pulley block H is attached to the collar of the adjacent animal. When the team advances, the rake teeth take up a load of hay which is then carried to the point where it is to be dumped and stacked. Then the team is backed a few feet which obviously causes traction on the ropes F so that they pull the rake back, or, what is the same thing, cause the ejector to slide forward on the rake proper, with the result that the load is pushed off the rake teeth.

In Fig. 2, the ejector is shown in full lines completely retracted and by dotted lines in the same figure it is shown advanced to about the middle of the rake teeth.

What we claim is:—

The combination with the bull-rake, comprising a series of teeth and a cross head connecting the same, of a load ejector adapted to slide on the rake and comprising a skeleton frame extending rearwardly from the cross-head and having a front elevated portion constituting the ejector proper, loop guides on the rake in which the longitudinal bars of the ejector are supported slidably, and the ejector frame having corresponding guides for the rake teeth, ropes attached to the rear portion of the ejector frame, and pulleys on the rake head through which such ropes run, the outer ends of the ropes being adapted for connection with the harness of a draft animal, as described.

In testimony whereof, we have signed our names to this specification in the presence of two subscribing witnesses.

I. M. BARNARD.
J. W. LAWLER.

Witnesses:
T. J. BARNARD,
S. S. ROBY.

Copies of this patent may be obtained for five cents each, by addressing the "Commissioner of Patents, Washington, D. C."